March 13, 1956 P. T. KEIM 2,737,722
PROPELLER BLADE ANGLE MEASURING DEVICE
Filed Oct. 30, 1951
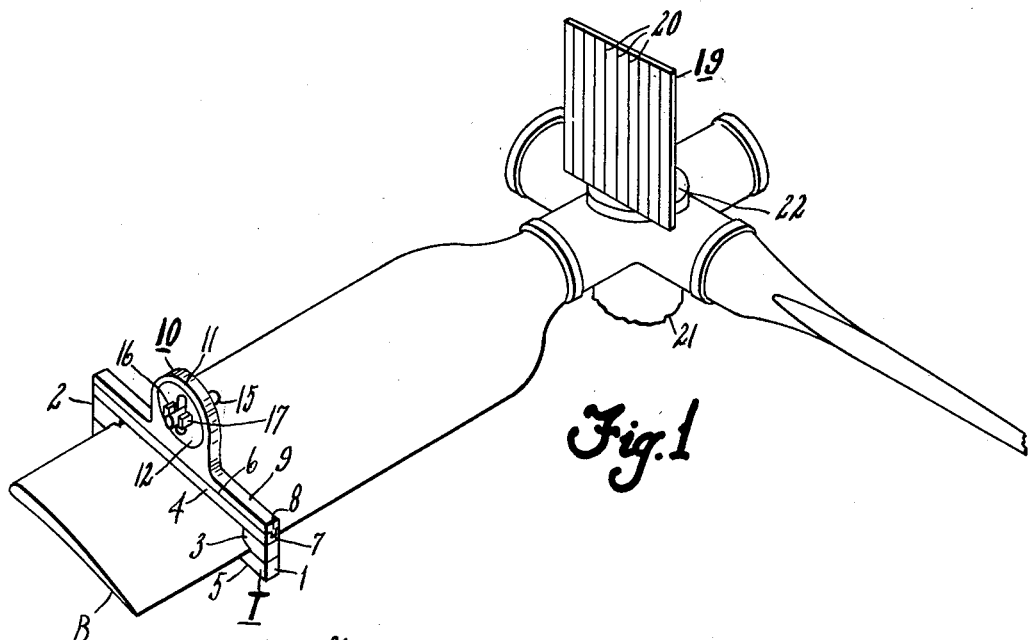
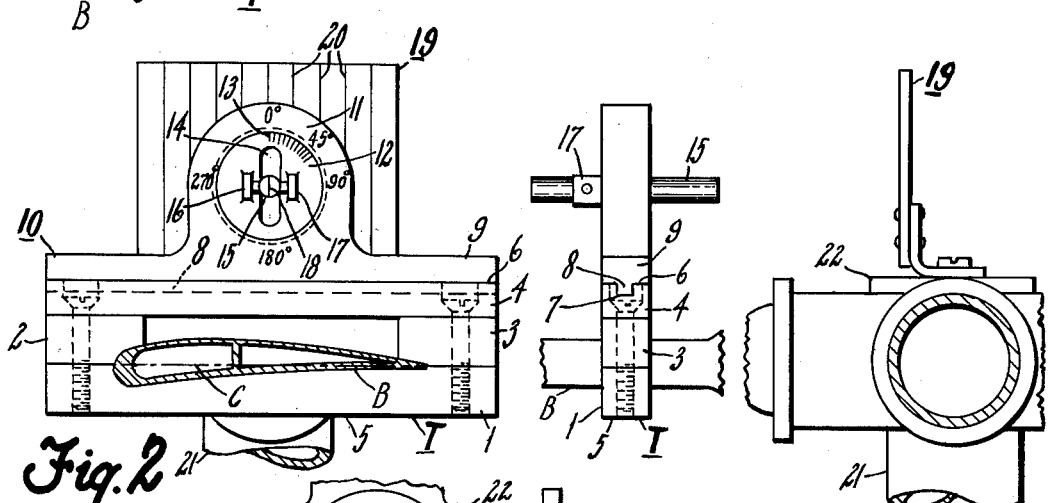
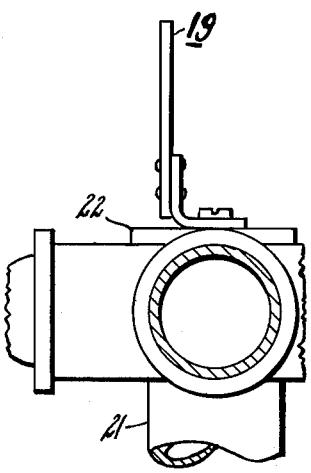
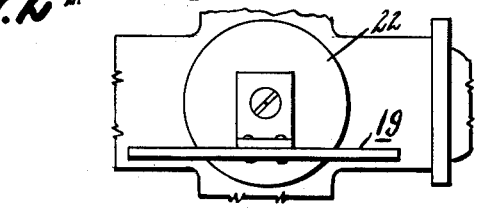
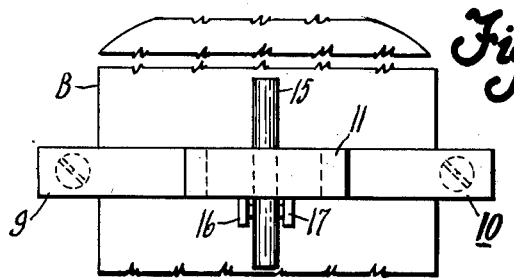
INVENTOR.
PAUL T. KEIM
BY Willits, Hardman and Fehr
HIS ATTORNEYS

United States Patent Office 2,737,722
Patented Mar. 13, 1956

2,737,722

PROPELLER BLADE ANGLE MEASURING DEVICE

Paul T. Keim, Vandalia, Ohio, assignor to General Motors Corporation, Detroit, Mich., a corporation of Delaware Application October 30, 1951, Serial No. 253,796

10 Claims. (Cl. 33—46)

The present invention relates to protractors and particularly to an improved protractor adapted for measuring the angular setting of propeller blades with relation to their hub when the propeller is installed on an aircraft.

It is often necessary to measure the high and low pitch settings of each blade of a propeller installed on an aircraft, and the several blades must be adjusted so as to have the same high and low pitch settings. Heretofore, in order to accurately ascertain the angular setting of variable pitch propeller blades, a propeller either had to be removed from the aircraft and inspected on a bench, or inspected on the aircraft with a levelling type protractor. However, when the aircraft is on board an aircraft carrier which is subject to rocking movements, the levelling type protractor is useless and in order to inspect the blades to determine their angular setting, the propeller had to be removed from the aircraft and inspected on a bench. The bench method of inspection is an expensive and time-consuming operation and hence, a device that will accurately measure blade angles of propellers installed on aircraft regardless of where the aircraft are moored, is very desirable.

One of my objects is to provide a device that is capable of accurately determining the angular setting of adjustably mounted propeller blades while the propeller assembly is installed on an aircraft, and regardless of where the aircraft is moored. However, the device can be used to measure blade angles of a propeller assembly that is mounted on a bench. I accomplish this object by mounting a protractor dial or scale on a template which is clamped to the blade under inspection at a pitch or angle measuring station. The protractor is provided with a rotatable member having a sight tube through which a target, mounted on the propeller hub, can be sighted to enable the operator to determine when the reading on the protractor scale is the correct blade angle setting.

Further objects and advantages of the present invention will be apparent from the following description, reference being had to the accompanying drawings wherein a preferred embodiment of the present invention is clearly shown.

In the drawings:

Like reference characters indicate corresponding parts throughout the several views and in which:

Fig. 1 is a perspective view of the improved protractor mounted on a propeller in position to measure the thrust side of a propeller blade.

Fig. 2 is a front view showing the device mounted on a propeller blade, the latter being shown in section.

Fig. 3 is a plan view of Fig. 2, all but a fragment of the blade being broken away to facilitate illustration.

Fig. 4 is a side view of Fig. 2, all but a fragment of the blade likewise being broken away.

As herein shown, the protractor includes a template T adapted to fit the thrust surface of a particular blade B at a particular blade angle measuring station. The template comprises a lower member 1 which is provided with a recess, shaped to coincide with the thrust surface contour of the blade under inspection. Upper members 2 and 3 are secured to member 1 by means of screw devices extending from a carrier 4. The upper members 2 and 3 are likewise provided with recesses that fit the camber surface contour at the leading and trailing edges, respectively, of the blade B. The template is so constructed that when the several members are assembled and clamped in position at an angle measuring station along the length of a blade, the bottom surface 5 of member 1 and the top surface 6 of carrier 4 are parallel to each other and also parallel to a blade chord line C, extending from the leading to the trailing edges of the blade at its greatest width.

The top surface 6 of the carrier 4 is provided with a groove 7 in which a projecting tongue 8, extending from the base member 9 of a protractor scale assembly 10, is adapted to fit. Thus, the protractor assembly is slidably mounted on the carrier. The protractor assembly 10 comprises a fixed hollow circular scale member 11 graduated in degrees, and an inner member 12, rotatable in the hollow member 11 and having an arcuate vernier scale 13 graduated in tenths of degrees. The rotatable inner member 12 is provided with a diametrically extending slot 14 through which a sight tube 15, mounted on trunnions 16 and 17 attached to member 12, is adapted to be moved. The pivotally mounted sight tube 15 is provided with a hair-line 18, perpendicular to the pivotal axis formed by trunnions 16 and 17.

A target 19, having spaced parallel lines 20 that are also parallel to a propeller hub shaft 21, is mounted on a propeller hub 22 by any suitable means. This target is used in conjunction with the hair-line 18 of the sight tube 15 to determine the angular setting of the blade B under inspection.

To determine the angular setting of a particular blade, a particular template, adapted to fit the thrust surface contour of the blade, is clamped to the blade at the blade angle measuring station. The protractor assembly 10 is then attached to the carrier 4 and the target 19 is attached to the propeller hub on an aircraft. The protractor assembly is then moved along the top surface 6 of the carrier 4 until the parallel target lines 20 are visible through the sight tube 15. The inner member 12 is then rotated until, upon pivotal movement of the sight tube, the hair-line 18 exactly coincides with any one of the parallel lines 20 on the target. When the hair-line coincides with a line on the target during pivotal movement of the sight tube, the exact angular setting of the propeller blade can be determined by reading the scales 11 and 13. Each of the several blades of the propeller is thus inspected and the blades are adjusted in their sockets so that all of the blades have the same angular setting at a particular position of propeller control mechanism.

Due to the fact that the template bottom surface and the protractor carrier are always parallel to each other and to the chord line of the particular blade under inspection, the center of rotation of the blade in its hub socket will not introduce any errors during blade angle measurement. Moreover, since the protractor assembly is independent of the template structure, only separate templates are required to measure blade angles of various types and sizes of propeller blades.

As a result of these improvements, it will be evident that a protractor has been provided which is simple in construction and operation. It will further be obvious that the improved protractor will make it possible to accurately measure the angles of propeller blades while they are installed on an aircraft, regardless of where the aircraft is moored. Hence, there is provided a protractor which is of universal application, as it can be used to measure the blade angles of variable pitch propellers on a bench or on the aircraft itself.

While the embodiment of the present invention as herein disclosed constitutes a preferred form, it is to be understood that other forms might be adopted.

What is claimed is as follows:

1. A propeller protractor for measuring the angular setting of a propeller blade supported by a shaft including in combination, a template engageable with a surface of said propeller blade, a scale assembly, means for adjustably mounting said scale assembly on said template, and means supported by said shaft having a reference line parallel to said shaft, said scale assembly including relatively movable members for sighting said line to determine the angular setting of said blade.

2. A propeller protractor for measuring the angular setting of a propeller blade supported by a shaft including in combination, a template rigidly attached to a surface of the propeller blade and having a surface parallel to a chord line of said blade, a scale assembly, means for adjustably mounting said scale assembly on the surface of said template, and means supported by said shaft having a reference line parallel to said shaft, said scale assembly including relatively movable members for sighting said line to determine the angular setting of said blade.

3. A propeller protractor for measuring the angular setting of a propeller blade supported by a shaft including in combination, a template engageable with a surface of said propeller blade, a scale assembly, means for mounting said scale assembly on said template, and means supported by said shaft having a reference line parallel to said shaft, said scale assembly including means for sighting said line to determine the angular setting of said blade.

4. A propeller protractor for measuring the angular setting of a propeller blade supported by a shaft including in combination, a template engageable with a surface of said propeller blade, a scale assembly, means for mounting said scale assembly on said template, means supported by said shaft having a reference line parallel thereto, said scale assembly including a stationary member and a movable member, and means attached to the movable member for sighting said reference line to determine the angular setting of said blade.

5. A propeller protractor for measuring the angular setting of a propeller blade supported by a shaft including in combination, a template engageable with the thrust surface of said propeller blade, a scale assembly, means for adjustably mounting said scale assembly on said template, and means supported by said shaft having a reference line parallel thereto, said scale assembly including a stationary member, a movable member and means for sighting said reference line to determine the angular setting of said blade.

6. A propeller protractor for measuring the angular setting of a propeller blade supported by a shaft including in combination, a template engageable with a surface of said blade, a scale carrier attached to said template, a target mounted on said shaft, and a scale assembly adjustably mounted on said carrier, said scale assembly including means for sighting said target for determining the angular setting of said blade.

7. A propeller protractor for measuring the angular setting of a propeller blade supported by a shaft including in combination, a template engageable with a surface of said propeller blade, a scale carrier attached to said template, a target attached to said shaft, and a scale assembly adjustably mounted on said carrier including a stationary member having graduations in degrees, a cooperable rotatable member having vernier graduations, and means carried by said rotatable member for effecting rotation thereof and for sighting said target to determine the angular setting of said blade by the registration of graduations on said members.

8. A propeller protractor for measuring the angular setting of a propeller blade supported by a shaft including in combination, a template engageable with the thrust surface of said blade, a scale carrier attached to said template, a target mounted on said shaft and a scale assembly adjustably mounted on said carrier, said scale assembly including a stationary member having marginal graduations in degrees, a cooperable rotatable member having marginal vernier graduations, and a pivotally mounted sight tube carried by and rotatable with said rotatable member for sighting said target to determine the angular setting of said blade by the registration of marginal graduations on said member.

9. A propeller protractor for measuring the angular setting of a propeller blade supported by a shaft including in combination, a template engageable with a surface of said blade, a scale carrier attached to said template, a target mounted on said shaft having spaced lines parallel thereto, and a scale assembly adjustably mounted on said carrier including means for sighting said parallel target lines to determine the angular setting of said blade.

10. A propeller protractor for measuring the angular setting of a propeller blade supported by a shaft including in combination, a template engageable with a thrust surface of said blade, a scale carrier attached to said template, a target supported by said shaft, and a scale assembly adjustably mounted on said carrier including means for sighting said target to determine the angular setting of said blades.

References Cited in the file of this patent

UNITED STATES PATENTS

| 341,690 | Reichenbach | May 11, 1886 |
| 420,245 | Rose | Jan. 28, 1890 |
| 1,597,357 | Godfrey | Aug. 24, 1926 |
| 1,736,247 | Bodenlos | Nov. 19, 1929 |
| 1,968,837 | Kneip | Aug. 7, 1934 |
| 2,170,824 | Lichtenwalner | Aug. 29, 1939 |
| 2,348,095 | Roby | May 2, 1944 |
| 2,402,567 | Milner | June 25, 1946 |
| 2,481,062 | Anderson | Sept. 6, 1949 |
| 2,636,280 | Drake | Apr. 28, 1953 |

FOREIGN PATENTS

| 195,558 | Great Britain | Apr. 5, 1923 |